Figure 1:
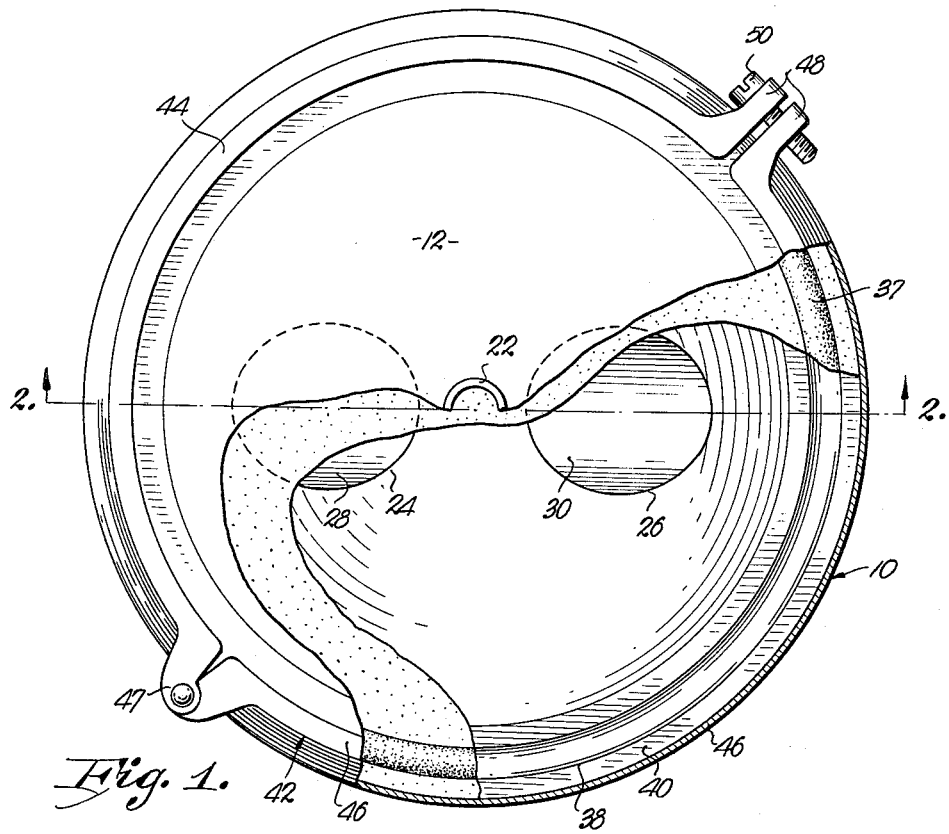

April 2, 1963

A. P. STEWART, JR., ET AL 3,083,943

DIAPHRAGM-TYPE VALVE

Filed July 6, 1959

INVENTORS.
Aubrey P. Stewart, Jr.
Gerhart A. Guckel
BY

Hovey, Schmidt, Johnson & Hovey
ATTORNEYS.

0
United States Patent Office 3,083,943
Patented Apr. 2, 1963

3,083,943
DIAPHRAGM-TYPE VALVE
Aubrey P. Stewart, Jr., Chicago, Ill., and Gerhart A. Guckel, Los Altos, Calif., assignors, by mesne assignments, to said Aubrey P. Stewart, Jr.
Filed July 6, 1959, Ser. No. 825,194
3 Claims. (Cl. 251—61)

This invention relates to improved valve structure and has for its primary object to provide a simple and efficient valve of the diaphragm type for controlling the flow of liquids in systems wherein it is necessary to have automatic flow control under extremely sanitary conditions.

It is, therefore, a further important object of the invention to provide a diaphragm-type valve having features therein eliminating the components of prior diaphragm-type valves which rendered the same undesirable for controlling flow of food liquids such as milk, where sanitation requirements are very high.

An additional important object of the invention is to provide a diaphragm-type valve adapted to control flow of milk or the like through pipes and which may be opened or closed either automatically or under manual control, by the simple expedient of introducing fluid into one compartment of the valve chamber or exhausting the fluid from such compartment through a single port in the valve casing.

A further important aim of the invention is to provide a highly sanitary diaphragm-type valve which may be quickly and easily disassembled for cleaning or replacement of the diaphragm therein by the single operation of removing a clamping ring serving to releasably interconnect the upper valve casing section to the lower section having the milk flow control lines connected thereto.

A still further important object of the invention is to provide a valve of the diaphragm type constructed in an improved manner so as to prevent any of the milk or other liquid normally passing through the liquid conduits, from remaining within the valve casing upon closing of the diaphragm and which would thereby tend to create unsanitary conditions by virtue of eventual spoiling of the milk.

An important object of the invention relates to the provision of a valve of the diaphragm type which, contrary to many prior valves, may be quickly cleaned by passage of a sterilizing solution through the valve without disassembly thereof and thus permitting low cost maintenance of sanitary conditions through the milk or other liquid food distribution system.

Other important objects and features of the instant valve will become obvious or be explained in greater detail as the following specification progresses.

Figure 2:
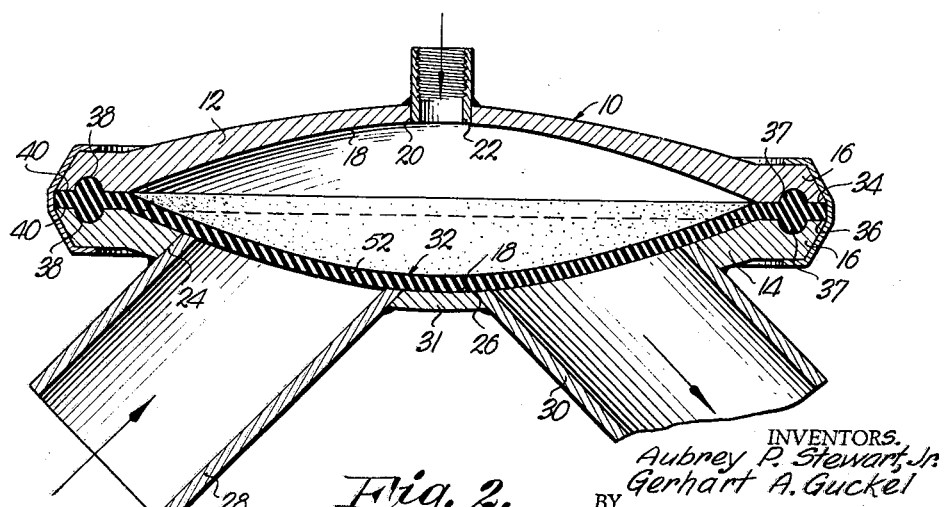

In the drawing:

FIGURE 1 is a plan view of a diaphragm-type valve embodying the principles of the present invention, with certain parts thereof being broken away and in section to reveal details of construction of the valve; and FIG. 2 is a vertical, cross-sectional view taken on the line 2—2 of FIG. 1 and looking upwardly in the direction of the arrows.

The valve embodying the principles of the present invention is illustrated in the drawing in its preferred form, includes a casing broadly designated by the numeral 10, and is specifically adapted to be interposed in a conduit for transferring liquid foods from one point to another.

Valve casing 10 preferably includes a pair of substantially identical, hemispherical-shaped sections 12 and 14 which are of material that may be maintained relatively easily in a sanitary condition and in the preferred valve, comprises stainless steel. As best shown in FIG. 2, sections 12 and 14 each have an annular, integral, peripheral flange portion 16 disposed in concentric relationship when valve casing 10 is assembled. The inner, convex surfaces 18 of sections 12 and 14 are of substantially identical curvature and present a chamber within casing 10 which is substantially elliptical in transverse section, whereby the major axis of such ellipse, and thus the diameter of the defined chamber, is substantially longer than the minor axis thereof and which corresponds to the distance between surfaces 18 of sections 12 and 14 along the common axis of circular sections 12 and 14.

Section 12 is provided with a port 20 preferably located on the axis of such section and receiving an internally threaded coupling 22 permitting a fluid conducting line such as a vacuum conduit or air pressure line to be connected directly to coupling 22.

Section 14 has a pair of elliptical openings 24 and 26 therein adapted to receive tubular members 28 and 30 respectively, each communicating with the interior of casing 10. The outer extremities of members 28 and 30 may be internally or externally threaded as desired, to permit connection of valve casing 10 to suitable liquid conduits, although it is to be understood that members 28 and 30 may be welded or otherwise connected to the liquid flow lines as desired. Openings 24 and 26 and thereby members 28 and 30, are disposed in spaced relationship to present a central area 31 of section 14 on the axis of sections 12 and 14, the disposition of area 31 being important for reasons to be specified hereinafter.

Sections 12 and 14 are adapted to receive a diaphragm therebetween and broadly numerated 32. Opposed, peripheral, marginal portions 34 and 36 of diaphragm 32 have annular beads 37 integral therewith and extending away from the major plane of diaphragm 32 in a direction to be complementally received within corresponding annular grooves 38 formed in the inner, opposed, annular surfaces 40 of respective flange portions 16 of sections 12 and 14.

Means for releasably interconnecting sections 12 and 14 comprises a split ring 42 including a pair of semicircular, transversely U-shaped segments 44 and 46 hingedly interconnected at 47 and provided with laterally extending elements 48 integral therewith at the extremities of the same normally positioned in proximal relationship. Bolt 50, removably threaded through the outer ends of elements 48, releasably interconnects opposed elements 48 to thereby maintain the ring 42 in normally circular relationship, as shown in FIG. 1. As indicated in FIG. 2, segments 44 and 46 are of sufficient transverse width to receive flange portions 16 of sections 12 and 14 therewithin, and with diaphragm 32 interposed between flange portions 16.

It is to be understood that means other than bolt 50 may be provided for releasably interconnecting opposed extremities of segments 44 and 46, and furthermore, that a one-piece split ring may be substituted for ring 42. In any event, it is to be preferred that quickly releasable structure be employed for interconnecting flange portions 16 of sections 12 and 14.

Best results have been obtained when diaphragm 32 is constructed of a silicon rubber having a synthetic resin cloth insert therewithin. In other words, diaphragm 32 is laminated and includes opposed, circular discs of silicon rubber with a synthetic resin fiber cloth interposed therebetween.

Diaphragm 32 is of a size to flex under the influence of fluid passing through casing 10 or, in the alternative, when fluid such as air is directed into section 12 through coupling 22. Likewise, diaphragm 32 should be capable of flexing when the fluid within section 12 is exhausted by a vacuum pump or the like connected to coupling 22.

It can now be seen that diaphragm 32 divides the chamber within valve casing 10 into a pair of compartments on opposed sides of the central area 52 of diaphragm 32.

In operation, when the central area 52 is moved out of engagement with the inner surface 18 of section 14, liquid entering valve casing 10 through tubular member 28 is permitted to flow into tubular member 30 below the convex surface of area 52 of diaphragm 32. It can be seen that when diaphragm 32 is in complemental engagement with surface 18 of section 12, the fluid is permitted to flow through valve casing 10 without restriction. Diaphragm 32 will be forced into engagement with convex surface 18 of section 12 when a vacuum is applied to coupling 22 communicating with the compartment between the upper surface of diaphragm 32 and surface 18 of section 12 or, in the alternative, when no fluid pressure is applied to the interior of valve casing 10 through coupling 22 and the liquid pressure in tubular member 28 is sufficient to force diaphragm 32 to its open position. Normally, the liquid pressure in tubular member 28 is sufficient to flex diaphragm 32 to the open position thereof but, in certain instances, the vacuum referred to above may be required to supplement the liquid inlet pressure through tubular member 28.

In order to close the valve, it is necessary to flex diaphragm 32 into the full line position illustrated in FIG. 2 by directing air or other fluid pressure into the compartment above diaphragm 32 and through coupling 22 as set forth above. Engagement of central area 52 of diaphragm 32 with the inner surface 18 of section 14 and particularly with area 31 of section 14 effectively prevents passage of liquid into member 30 from inlet member 28. In this connection, it can be seen that the fluid pressure directed into the compartment above diaphragm 32 must be sufficient to overcome the liquid pressure of the liquid attempting to flow through valve casing 10 from tubular member 28 to tubular member 30.

If it is desired that the valve be only partially closed, as when it is advantageous to operate the valve as a back pressure check, the air pressure within casing 10 above diaphragm 32 should be adjusted so that the same is sufficient to only partially close openings 24 and 26 against the force of the liquid flowing through tubular members 28 and 30.

One advantageous feature of the present valve is the fact that all of the surfaces are smooth and devoid of weirs, threads, holes or projections within casing 10 which would tend to cause the liquid food to accumulate therein and spoil after a period of time in the absence of refrigeration. The smooth surfaces referred to facilitate cleaning of valve casing 10 and in particular, it is to be noted that such valve may be thoroughly cleaned by passage of sterilizing solutions therethrough and without the necessity of disassembling the valve.

No restrictions exist to full and complete flow of liquid through valve casing 10 when diaphragm 32 is in the completely open position and thereby engaging the inner surface of section 12, yet the opening and closing of the valve may be easily accomplished by utilization of a single air pressure control. Any desired back pressure may be placed on the incoming liquid by virtue of the manner in which depression of diaphragm 32 may be infinitely varied under the influence of air pressure directed into casing 10.

Of prime importance is the fact that in the closed position of diaphragm 32, the latter fits tightly against the inner surface 18 of section 14 and particularly area 31 thereof to completely force out any liquid which would otherwise be retained in casing 10. In the case of perishable liquids, such as milk, it is extremely important that no liquid be retained in the casing 10 when the latter is closed, since valves of this character are generally not refrigerated and spoilage of the liquid would otherwise result.

Another feature is the fact that the valve may be readily disassembled for cleaning or inspection operations by the simple expedient of unscrewing bolt 50 from element 48 on segment 46, whereby the latter may be pivoted relative to segment 44 until such segments clear flange portions 16 of sections 12 and 14 and thus allowing section 12 to be removed from its normal disposition overlying section 14. Likewise, diaphragm 32 may be readily removed or replaced as required.

Attention is also directed to the provision in valve casing 10 of an inner chamber of transverse, elliptical configuration whereby the central part of area 52 of diaphragm 32 travels very little distance in relation to the diameter of diaphragm 32, and during opening and closing of the valve. This factor materially increases the longevity of diaphragm 32. It can thus be seen that when diaphragm 32 is in the open position thereof engaging the convex inner surface 18 of section 12, even though the incoming pressure of liquid through tubular member 28 is relatively high, no deleterious stress is placed on diaphragm 32 since the latter complementally and uniformly engages the convex surface 18 of section 12. The only unsupported area of diaphragm 32 is that which is directly aligned with coupling 22 and this small portion of the diaphragm is not of sufficient area to cause serious stress on the rubber material from which diaphragm 32 is constructed.

By the same token, diaphragm 32 is supported by surface 18 of section 14 when diaphragm 32 is in the closed position thereof as illustrated in FIG. 2, by virtue of air being directed into the interior of casing 10 through coupling 22. Again, the only unsupported areas of diaphragm 32 in the closed position thereof are openings 24 and 26, and therefore, very little strain is placed on the material from which diaphragm 32 is constructed. This is particularly true in view of the fact that approximately equivalent pressures exist on both sides of area 52 of diaphragm 32 overlying opening 24.

In the instance of very high pressure against diaphragm 32 across opening 26, it may be desirable to place spaced bridge members or other suitable structure across the open end of tubular member 30 within opening 26 to support the area of diaphragm 32 overlying such opening, or in the alternative, to place metal reenforcing elements or other equivalent means within the section of diaphragm 32 which normally overlies opening 26.

Another feature of the instant valve assuring a long useful life of diaphragm 32 is the fact that pressure placed on the upper surface of such diaphragm to move the same into the closed position thereof, is evenly distributed across the entire surface of diaphragm 32 rather than at a certain localized point or area which would thereby place unequal pressures on the outer surface of the diaphragm. This feature provides a large sealing area without undue distortion or strain on diaphragm 32.

A further salient feature of the invention resides in the fact that when diaphragm 32 is in the closed position thereof as shown in FIG. 2, both of the inlet and outlet openings 24 and 26 are closed by diaphragm 32, thereby preventing leak-back of liquid into valve casing 10 at the discharge opening where a perishable liquid would become "dead-ended" in the valve and thus spoil in a period of time.

The sanitary features of the present valve are readily apparent when reference is made to utilization of the same for controlling flow of milk through a conduit or the like. In milk bottling or other processing operations, it is important that all of the liquid transporting equipment be capable of rapid and thorough sterilization and furthermore, that complete sterility of the liquid product during passage of the same through the system be maintained. The present valve contains no parts which move in and out of a non-sterile zone, nor is there any necessity of providing a special sterile zone for movement in and out of shafts and other mechanical appurtenances to shift diaphragm 32.

It is sometimes desirable to modify the present valve so that diaphragm 32 is maintained in the normally closed position illustrated in FIG. 2, and this can readily be accomplished by inserting a spring between surface 18 of section 12 and the upper surface area of diaphragm 32. The spring should preferably be of spiral configuration, with the upper end of the spring contacting the inner convex surface of section 12 at the axis of casing 10 and in surrounding relationship to port 20. This spring serves to maintain diaphragm 32 in a closed position and the same may be shifted to the open position thereof by applying a vacuum to coupling 22 sufficient to overcome the tension of the coil spring defined above.

Other modifications of the present valve may be made without departing from the spirit of the invention and it is therefore intended to be limited only by the scope of the appended claims.

Having thus described the invention what is claimed as new and desired to be secured by Letters Patent is:

1. In a valve, a casing having a pair of separable sections presenting a chamber therewithin having inner surfaces of arcuate configuration throughout, one of the sections being provided with a fluid port and the other section having an inlet opening and an outlet opening; split ring means engageable with said sections at the peripheries thereof for releasably interconnecting the sections to permit rapid separation thereof; a diaphragm interposed between said sections and dividing the chamber into a first compartment communicating with said port and a second compartment on the opposite side of the diaphragm communicating with said inlet and the outlet, said diaphragm being constructed and arranged to be movable from an open position in complementally seated engagement with substantially the entire innert surface of said one section for permitting fluid to pass into the second compartment through said inlet opening and thence outwardly through said outlet opening, to a closed location in complementally seated engagement with substantially the entire inner surface of said other section and entirely closing said inlet and outlet openings respectively; and a pair of normally substantially upright tubular members secured to said other section at the inlet and outlet openings respectively and projecting outwardly therefrom, said tubular members being relatively angularly disposed on said other section with the longitudinal axes of said members being convergent as said chamber is approached thereby to prevent the accumulation of fluid in said members and said second compartment proximal to said openings when said diaphragm is in said closed location, the opposed faces of said sections being provided with annular grooves, said peripheral margin of the diaphragm having opposed beads spaced from the outer edge thereof releasably receivable within respective grooves in the sections, said means releasably interconnecting said sections being in engagement with said sections proximal to said grooves and in clamping relationship to said beads.

2. In a valve, a casing having a pair of separable sections presenting a chamber therewithin having inner surfaces of arcuate configuration throughout, one of the sections being provided with a fluid port and the other section having an inlet opening and an outlet opening; split ring means engageable with said sections at the peripheries thereof for releasably interconnecting the sections to permit rapid separation thereof; a diaphragm interposed between said sections and dividing the chamber into a first compartment communicating with said port and a second compartment on the opposite side of the diaphragm communicating with said inlet and the outlet, said diaphragm being constructed and arranged to be movable from an open position in complementally seated engagement with substantially the entire inner surface of said one section for permitting fluid to pass into the second compartment through said inlet opening and thence outwardly through said outlet opening, to a closed location in complementally seated engagement with substantially the entire inner surface of said other section and entirely closing said inlet and outlet openings respectively; and a pair of normally substantially upright tubular members secured to said other section at the inlet and outlet openings respectively and projecting outwardly therefrom, said tubular members being relatively angularly disposed on said other section with the longitudinal axes of said members being convergent as said chamber is approached thereby to prevent the accumulation of fluid in said members and said second compartment proximal to said openings when said diaphragm is in said closed location, said sections having opposed, annular, aligned, peripheral flange portions, said split ring means releasably interconnecting the sections including a split ring retainer having a pair of hingedly interconnected segments receiving opposed flange portions of the sections.

3. In a valve, a casing having a pair of separable sections representing a chamber therewithin having inner surfaces of arcuate configuration throughout, one of the sections being provided with a fluid port and the other section having an inlet opening and an outlet opening; split ring means engageable with said sections at the peripheries thereof for releasably interconnecting the sections to permit rapid separation thereof; a diaphragm interposed between said sections and dividing the chamber into a first compartment communicating with said port and a second compartment on the opposite side of the diaphragm communicating with said inlet and the outlet, said diaphragm being constructed and arranged to be movable from an open position in complementally seated engagement with substantially the entire inner surface of said one section for permitting fluid to pass into the second compartment through said inlet opening and thence outwardly through said outlet opening, to a closed location in complementally seated engagement with substantially the entire inner surface of said other section and entirely closing said inlet and outlet openings respectively; and a pair of normally substantially upright tubular members secured to said other section at the inlet and outlet openings respectively and projecting outwardly therefrom, said tubular members being relatively angularly disposed on said other section with the longitudinal axes of said members being convergent as said chamber is approached thereby to prevent the accumulation of fluid in said members and said second compartment proximal to said openings when said diaphragm is in said closed location, said sections having opposed, annular, aligned, peripheral flange portions, said split ring means releasably interconnecting the sections including a split ring retainer having a pair of hingedly interconnected segments receiving opposed flange portions of the sections, each segment of said retainer being substantially U-shaped in transverse cross-section, there being releasable structure interconnecting corresponding ends of the segments and capable of decreasing the effective diameter of the retainer to securely interconnect said flange portions of the retainer.

References Cited in the file of this patent

UNITED STATES PATENTS

| | | |
|---|---|---|
| 498,535 | Dixon | May 30, 1893 |
| 674,276 | Moore | May 14, 1901 |
| 1,269,721 | Kuntny | June 18, 1918 |
| 2,230,595 | Horton | Feb. 4, 1941 |
| 2,407,765 | McPherson | Sept. 17, 1946 |
| 2,529,028 | Landon | Nov. 7, 1950 |
| 2,574,700 | Knauss | Nov. 13, 1951 |
| 2,625,886 | Browne | Jan. 20, 1953 |
| 2,629,399 | Kulick | Feb. 24, 1953 |
| 2,630,874 | Langdon | Mar. 10, 1953 |
| 2,685,889 | Leighton | Aug. 10, 1954 |
| 2,990,252 | Geldern et al. | Jan. 27, 1961 |

FOREIGN PATENTS

| | | |
|---|---|---|
| 528,405 | France | Aug. 16, 1921 |